United States Patent [19]
Hotta

[11] Patent Number: 5,711,592
[45] Date of Patent: Jan. 27, 1998

[54] LAMPLIGHT DEVICE FOR VEHICLE

[75] Inventor: Yoshihiko Hotta, Wako, Japan

[73] Assignee: Honda Giken Kogyo Kabushiki Kaisha, Tokyo, Japan

[21] Appl. No.: 542,452

[22] Filed: Oct. 12, 1995

[30] Foreign Application Priority Data

Oct. 25, 1994 [JP] Japan .................. 6-283991

[51] Int. Cl.$^6$ .................................. B60Q 1/30
[52] U.S. Cl. .............. 362/80; 362/31; 362/293; 362/311; 362/327; 362/330; 359/15; 359/34
[58] Field of Search .................. 359/15, 22, 34; 385/37; 340/479, 815.56, 815.57; 362/61, 80, 26, 27, 31, 32, 293, 80.1, 327, 330, 311

[56] References Cited

U.S. PATENT DOCUMENTS

| | | | |
|---|---|---|---|
| 4,892,369 | 1/1990 | Moss | 359/22 |
| 5,101,193 | 3/1992 | Smith et al. | 359/15 |
| 5,165,772 | 11/1992 | Wu | 362/26 |
| 5,186,533 | 2/1993 | Hori | 359/22 |
| 5,227,773 | 7/1993 | Wu et al. | 362/31 |

*Primary Examiner*—Alan Cariaso
*Attorney, Agent, or Firm*—Weiner, Carrier, Burt & Esser, P.C.; Joseph P. Carrier; Irving M. Weiner

[57] ABSTRACT

A lamplight device for a vehicle which is inconspicuous when it is turned off is provided. The lamplight device comprises a reflection type or transmission type optical member installed on a predetermined place of a vehicle body either directly or through an appearance member, and is adapted to reflect or refract a light of a specific wave length, a light projecting mechanism for projecting a light of the specific wave length, and a light guiding mechanism for guiding the light projected from the light projecting mechanism to an outer surface or an reverse surface of the reflection type or transmission type optical member.

20 Claims, 4 Drawing Sheets

LAMPLIGHT DEVICE FOR VEHICLE

BACKGROUND OF THE INVENTION

1. Field of the Invention

The present invention relates to a lamplight device for a vehicle which is installed on a surface of a vehicular body and emits light to the surroundings for illumination or indication.

2. Description of Relevant Art

Generally, a lamplight device for a vehicle such as a winker, a taillight, a stoplight or the like has a lens covering the surface of the vehicular body and a bulb as a light source housed inside the lens. The lens has its own color, for example, amber in case of the winker and red in cases of the taillight and the stoplight, so that the color tone of the light portion is different from that of the vehicular body even if the light is turned off, and it has been a large restriction for appearance design of the vehicle.

Some vehicles have amber LED or red LED arranged for a lamplight device, but in this case also the color tone of the place arranged with the LED is different from that of the vehicular body when the LED is turned off.

Accordingly, there is a case that a smoky lens is adopted. For example, in the case of the winker a smoky outer lens is disposed over the outside of the amber lens. In this winker, since the inner lens appears dark when the winker is not turned on owing to the transmission factor of the smoky lens, the amber color is not conspicuous. Sometimes a lens colored by an amber pigment added with a smoky color pigment is used.

Further, there is a case that a winker having a colorless transparent lens with a lens-cut and an amber filter provided around a bulb is used. In this case, since light from the turn on bulb becomes amber at the filter and is scattered at the lens-cut, an area of the portion colored amber can be reduced compared with the light emitting area of the winker. When the winker is not turned on, the interior of the winker can hardly be seen owing to the lens-cut and the amber color is not conspicuous.

However, in the former case wherein the smoky lens is used, since light quantity from the bulb is decreased corresponding to the transmission factor of the smoky lens, a smoky lens having so dark color as to make a color tone of the inner lens invisible can not be provided.

In the latter case wherein the filter is provided around the bulb, the interior of the winker can be seen more or less through the lens-cut because the lons is colorless and transparent. Therefore, a sufficient effect to make the appearance inconspicuous can not be obtained and further there s a problem that the whole radiating surface does not emit light uniformly when the winker is turned on.

SUMMARY OF THE INVENTION

The present invention is accomplished in view of the above points and it is an object of the present invention to provide a lamplight device for a vehicle in which a color assumed by a lens when the device is not turned on can be set freely so as to a degree of freedom of the appearance design.

In order to achieve the above object, according to the present invention, there is provided a lamplight device for a vehicle comprising a reflection type optical member installed on a predetermined place of a vehicular body directly or through an appearance member and adapted to reflect light of a specific wave length, a light projecting means for projecting light of the specific wave length, and a light guiding means for guiding the light projected from the light projecting means to an outer surface of the reflection type optical member.

When the light projecting means projects the light of the specific wave length, the light is guided to the outer surface of the reflection type optical member by the light guiding means and reflected, therefore the predetermined place of the vehicle can be lit with the light of the specific wave length.

When the light projecting means does not project the light of the specific wave length, the reflection type optical member lets exterior light pass so that the surface of the vehicular body or the appearance member can be seen through the optical member. Therefore, it is possible to freely give the place installed with the optical member the same color tone as the vehicular body color or a voluntary color tone by means of the appearance member, thus improving a degree of freedom of the appearance design.

The present invention provides also a lamplight device for a vehicle comprising a transmission type optical member installed on a predetermined place of a vehicular body directly or through an appearance member and adapted to refract of a specific wave length, a light projecting means for projecting a light of the specific wave length, and a light guiding means for guiding the light projected from the light projecting means to a reverse surface of the transmission type optical member.

In this lamplight device, when the light projecting means projects the light of the specific wave length, the light is guided to the reverse surface of the transmission type optical member by the light guiding means and refracted. Therefore, the predetermined place of the vehicle can be lit with the light of the specific wave length.

When the light projecting means does not project the light of the specific wave length, the transmission type optical member lets exterior light pass so that the surface of the vehicular body or the appearance member can be seen through the optical member. Therefore, it is possible to freely give the place installed with the optical member the same color tone as the vehicular body color or a voluntary color tone by means of the appearance member, thus improving a degree of freedom of the appearance design.

In a lamplight device of the present invention, the light projected from the light projecting means enters into an end portion of the light guiding means. According to the lamplight device, it is unnecessary to position the light projecting means behind the lens or transmission type optical member so that the lamplight device can be formed thin and the degree of freedom of the design is also improved.

In another lamplight device of the present invention, first and second optical members adapted to reflect or refract respectively light of first and second specific wave lengths different from each other are combined, the light guiding means is arranged adjacent to the combined optical members, a first light projecting means for projecting light of the first specific wave length is positioned at an end portion of the light guiding means near to the first optical member, and a second light projecting means for projecting light of the second specific wave length is positioned at another end portion of the light guiding means near to the second optical member, thereby lights of different wave lengths enter into the light guiding means from both end portions thereof. This lamplight device can emit lights of different color tones in spite of a simple and compact constitution. Other advantages, objects and salient features

3 of the invention will be apparent from the following detailed description which, when taken in conjunction with the appended drawings, discloses preferred embodiments of the invention.

DETAILED DESCRIPTION OF THE PREFERRED EMBODIMENTS

Figure 1:
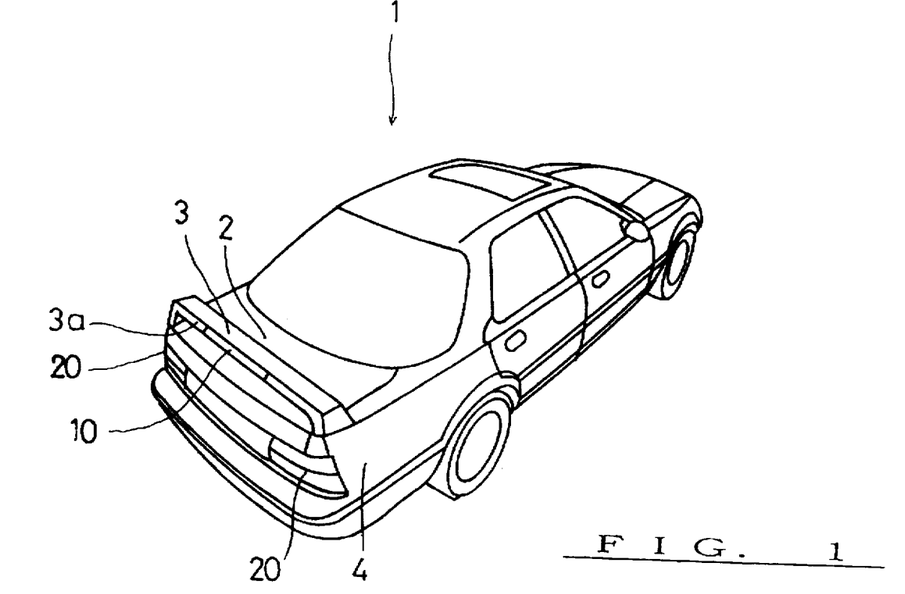
FIG. 1 is a rear perspective view of an automobile installed with lamplight devices according to one embodiment of the present invention.

Hereinafter, an embodiment of the present invention will be described with reference to FIGS. 1 to 7. FIG. 1 is an outside view of an automobile 1 applied with lamplight device of the embodiment viewed from rear and obliquely above.

A rear wing 3 furnished on a trunk lid 2 in a rear part of the vehicular body has a rear end surface 3a facing rearward and extending transversely in the right and left direction, and at the middle of the end surface 3a is provided a laterally elongated high-mount stoplight 10. At right and left corner portions of a rear body cover 4 are provided rear combination lights 20 having a winker and a brake lamp combined together.

Figure 2:
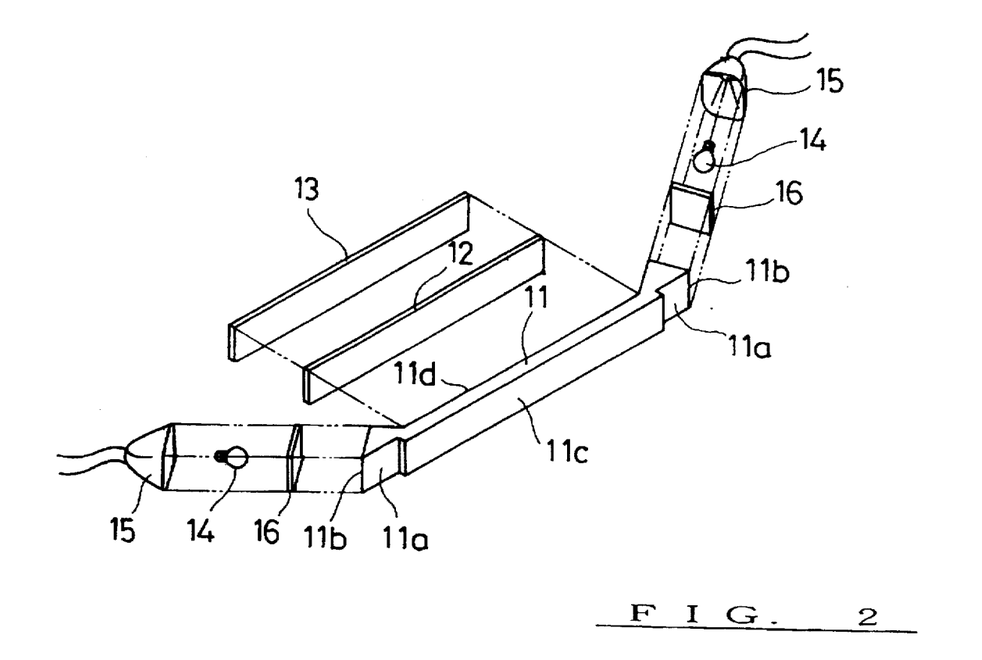
FIG. 2 is a disintegrated perspective view of a high-mount stoplight.
Figure 3:
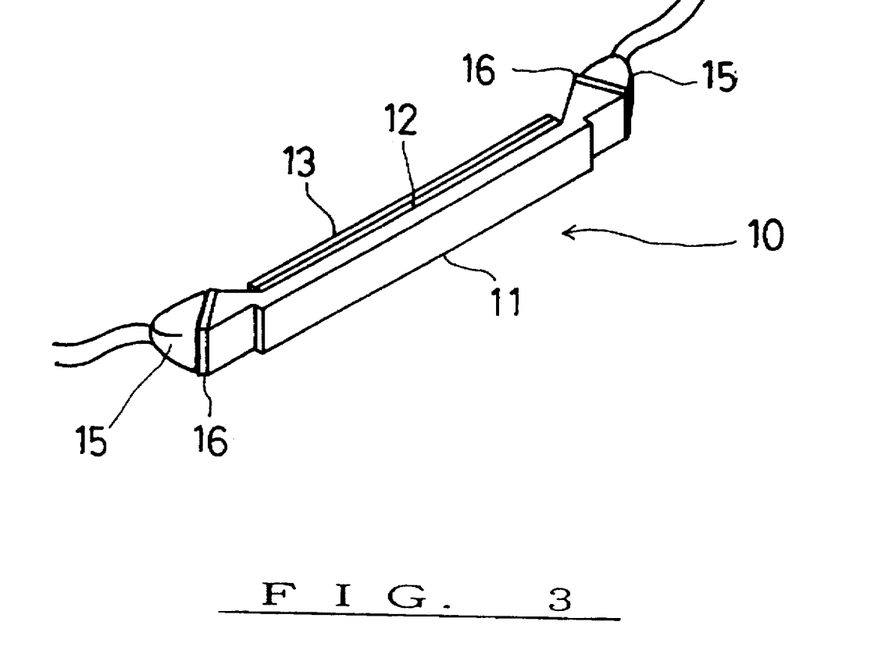
FIG. 3 is a perspective view showing an integrated state of the high-mount stoplight.
Figure 4:
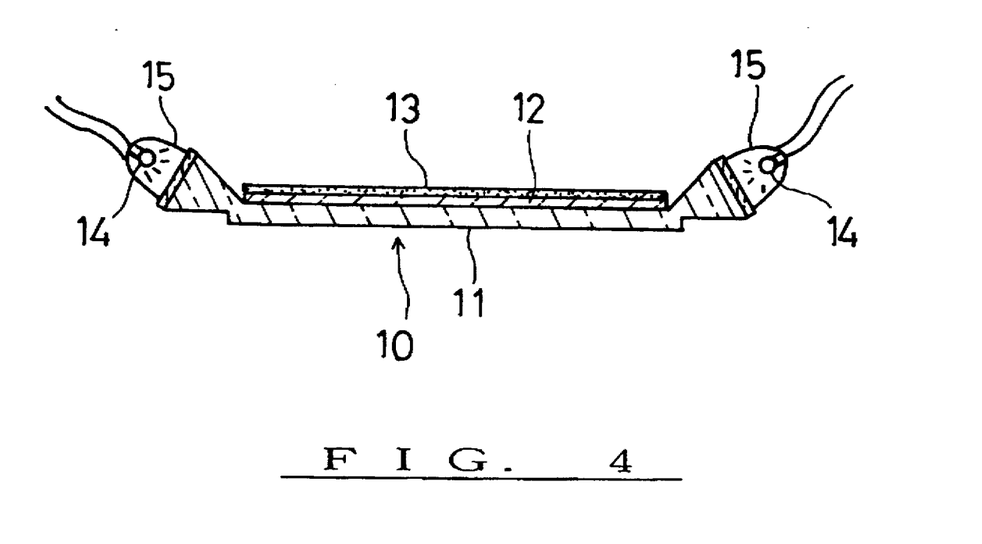
FIG. 4 is a sectional view of the high-mount stoplight.

First, the construction of the high-mount stoplight 10 will be described with reference to FIGS. 2-4. FIG. 2 is a disintegrated perspective view of the high-mount stoplight 10. A lens 11 constitutes a light guiding member as well as an outer surface of the vehicular body and is formed in a shape of an elongate board extending transversely in the right and left direction. Both end portions 11a, 11a of the lens 11 are bent a little in front, and end faces 11b, 11b face obliquely outside. A surface 11c of a long rectangular portion excluding both end portions 11a, 11a forms a part of the rear end surface 3a of the rear wing 3.

To the reverse surface 11d of the lens 11 is joined a laterally elongate rectangular reflection type hologram sheet 12 and further on the sheet 12 is joined a similarly laterally elongate and rectangular colored base sheet 13.

The reflection type hologram sheet 12 is an optical member having a nature to selectively reflect red light and transmit the other light. The colored base sheet 13 is colored in the same color as the vehicular body color and the rear wing 3 is also painted in the same color.

On each of the end faces 11b of both end portions 11a of the lens 11 is provided a light projecting means which comprises a paraboloid reflector 15, a bulb 14 housed within the reflector 15 and a red filter 16 covering the opening portion of the reflector 15 and attached to the end face 11b. FIG. 3 shows the assembled high-mount stoplight 10. It is elongate in the right and left direction and thin and flat in its entirety.

When the bulbs 14 are turned off, exterior light passes through the lens 11 and the reflection type hologram sheet 12, reflects at the colored base sheet 13 and again passes through the reflection type hologram sheet 12 and the lens 11, so that the color of the colored base sheet 13, namely the color of the vehicular body, can be seen as it is on the lens surface of the high-mount stoplight 10. Therefore, the rear end surface 3a of the rear wing 3 becomes the same color in its entirely 11c and the existence or presence of the high-mount stoplight 10 is not sensed by observers when the bulbs 14 are not on.

When the bulbs 14 are turned on, the light reflects at the paraboloid reflector 15 covering the behind of the bulbs 14 to generate parallel light, which passes through the red filter 16 to become red light and then enters into the lens 11 which acts as a light guiding member. The red light advances within the lens 11 reflecting to the surface of the reflection type hologram sheet 12 and is reflected at the lens surface 11c. Since the reflected red light passes through the lens 11, the lens surface 11c of the high-mount stoplight 10 lights in red.

As described above, the high-mount stoplight 10 assumes the same color as the painted color of the rear wing 3 and its existence is not conspicuous when it is turned off. On the other hand, when it is turned on, it lights in red and can play a role of the stoplight. Therefore, the degree of freedom of the vehicle appearance design is improved.

In addition, since it is possible to construct the whole high-mount stoplight in a flat configuration by arranging the light source at an end portion, a large installing space is unnecessary and the degree of freedom of the layout is also improved.

Hitherto, sometimes an exterior light entering into a conventional lamplight reflects at a reflector thereof and suspectedly lights the exterior lens of the lamplight in red. However in the stoplight 10 according to the invention, even if the exterior light enters into the lens 11 when it is not lighted, the light reflects at the colored base sheet 13 to assume the same color as the vehicular body and the suspected lighting never occurs.

Next, the construction of the rear combination light 20 will be explained based on FIGS. 5-7.

Figure 5:
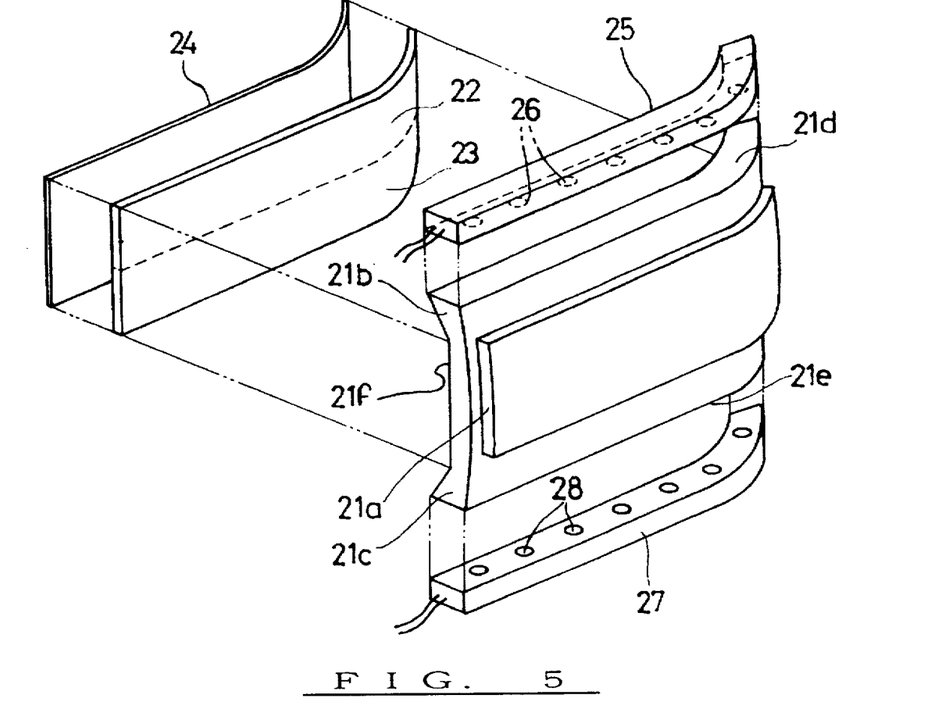
FIG. 5 is a disintegrated perspective view of a rear combination light.

FIG. 5 is a disintegrated perspective view of the rear combination light 20 in which a board-shaped lens 21 constituting a light guiding member as well as an outer surface of the vehicular body is bent along a corner portion of the rear body cover 4. The lens 21 is elongate in the right and left direction and has a slightly curved outside surface. On a central portion in the vertical direction of the outside surface is formed a belt-shaped swelled part 21a extending in the right and left direction. The surface of the swelled part 21a forms a part of the rear body cover 4.

Thicknesses of upper and lower end portions 21b, 21c of the lens 21 are gradually increased toward inside as approaching upper and lower end faces 21d, 21e. Laterally elongate rectangular board-shaped reflection type hologram sheets 22, 23 having a bent end portion are in contact with each other up and down so as to form a board and these hologram sheets 22, 23 are joined to a reverse surface 21f of the lens 21 except at the upper and lower end portions 21b, 21c. Then, on the hologram sheets 22, 23 is joined a colored base sheet 24 having the same shape.

The upper reflection type hologram sheet 22 is an optical member having a nature to selectively reflect amber light and transmit the other light. The lower reflection type hologram sheet 23 is an optical member having a nature to selectively reflect red light and transmit the other light. The colored base sheet 24 is colored in the same color as the vehicular body color.

On the upper and lower end faces 21d, 21e of the lens 21 are attached bar-shaped LED supporting members 25, 27 respectively. In the upper LED supporting member 25 are arranged lengthwise amber color LEDs 26 facing to the lower face and in the lower LED supporting member 27 are arranged lengthwise red color LEDs 28 facing to the upper face.

Figure 6:
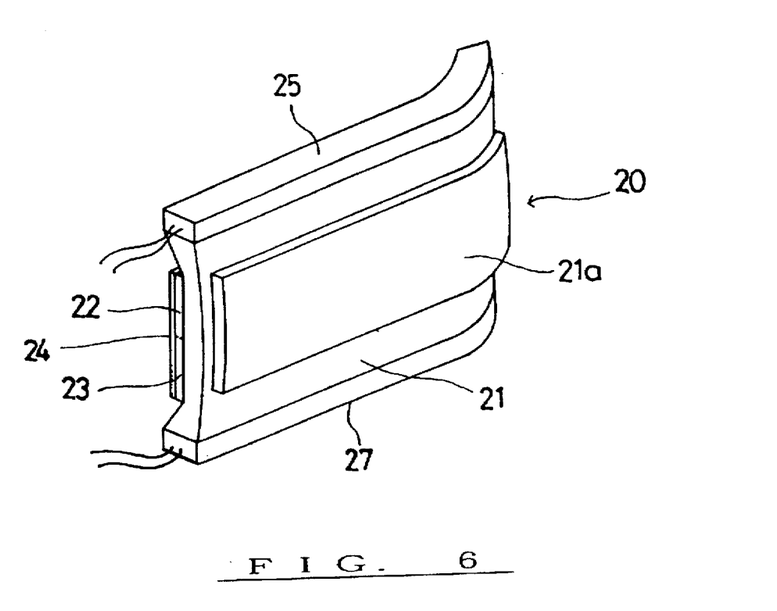
FIG. 6 is a perspective view showing an integrated state of the rear combination light.
Figure 7:
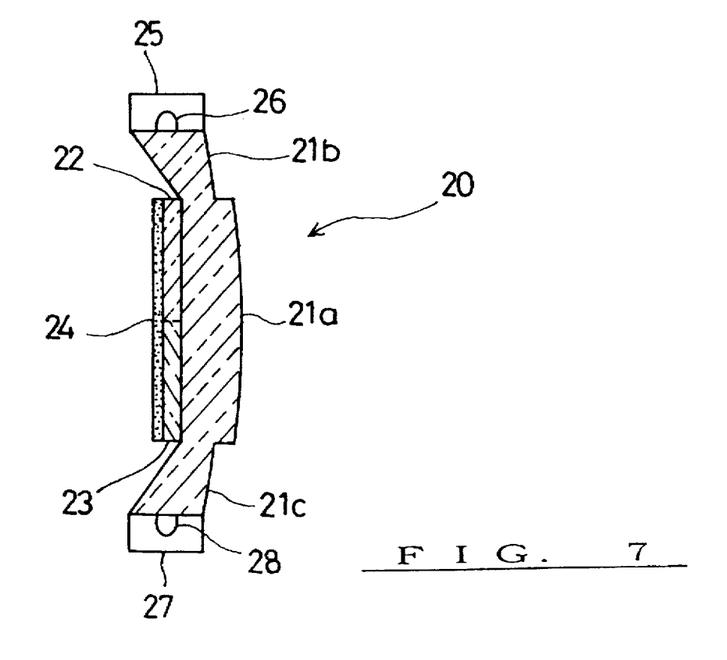
FIG. 7 is a sectional view of the rear combination light.

As shown in FIG. 6, the rear combination light 20 assembled in such manner as described above assumes a shape of a very thin and flat board in its entirety with one end bent.

When the amber color LEDs 26 and the red color LEDs 28 are turned off, exterior light passes through the lens 21 and the reflection type hologram sheets 22, 23 and reflects at the colored base sheet 24 so that the color of the colored base sheet 24, namely the color of the vehicular body, can be seen as it is on the lens surface of the rear combination light 20. Therefore, the corner portion of the rear body cover 4, including the combination light 20, becomes the same color in its entirety and the existence of the rear combination when the LEDs 26, 28 are not lit light 20 is not conspicuous.

When the amber color LEDs 26 are turned on, the amber light from the LEDs 26 enters into the lens 21 which acts as a light guiding member from the upper end face 21d and advances within the lens 21 reflecting to the outside surface of the reflection type hologram sheet 22 and is reflected at the surface. Since the reflected amber light passes through the lens 21, an upper portion of the lens surface of the rear combination light 20 lights in amber color.

It is to be noted that as the reflection type hologram sheet 23 does not reflect the amber color light, the lower portion of the lens surface of the rear combination light 20 does not light. Therefore, in response to turning on and off of the amber color LED 26, the upper portion of the rear combination light 20 turns on and off in amber color and thus turn indication to the right or the left can be carried out.

Next, when the red color LEDs 28 are turned on, the red light enters into the lens 21 from the lower end face 21e and advances within the lens 21 repeating reflection to the outside surface of the reflection type hologram sheet 23 and is reflected at the surface. The reflected red light passes through the lens 21 and the lower portion of the lens surface of the rear combination light 20 lights in red color.

As the upper reflection hologram sheet 22 does not reflect the red color light, the upper portion of the lens surface of the rear combination light 20 does not light. Therefore, when the red color LEDs 26 are turned on, the lower portion of the rear combination light 20 lights in red color to enable a brake operation indication.

In the rear combination light 20 also, a large degree of freedom of the appearance design can be achieved and the suspected lighting caused by external light in conventional lamplight devices can be prevented.

Since the rear combination light is very thin in itself and arranged on the corner portion of the rear body cover 4, it does not reduce the volume of the trunk and a degree of freedom of the layout is improved.

Though in the above-mentioned high-mount stoplight 10 and rear combination light 20, the colored base sheets 13, 24 have the same color as the vehicular body color so as not to be conspicuous, on the contrary, it is also possible to set a voluntary color freely for the colored base sheet or to give it a pattern or indicia. Accordingly, the degree of freedom of the appearance design is increased still more.

Figure 8:
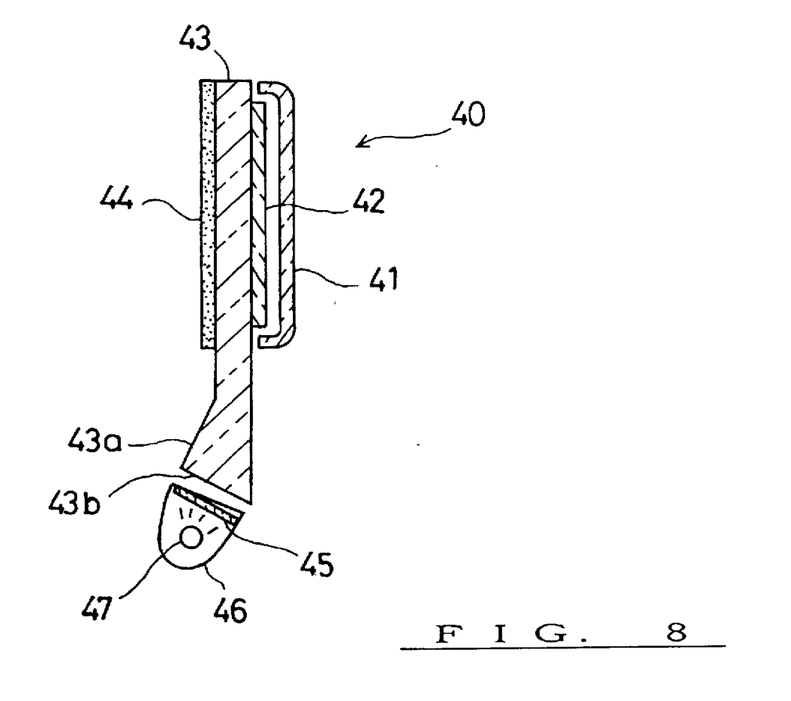
FIG. 8 is a sectional view of a taillight according to another embodiment of the present invention.

Next, another embodiment of the invention using a transmission type hologram sheet will be described based on FIG. 8. This embodiment is a taillight and FIG. 8 is a sectional view of the taillight 40. Inside of a transparent outer lens 41 is arranged a transmission type hologram sheet 42 joined to a light guiding member 43, and on a reverse side surface and at a position corresponding to the transmission type hologram sheet 42 is joined a colored base sheet 44.

The transmission type hologram sheet 42 has a nature to refract selectively only red color light and the colored base sheet 44 is colored in the same color as the vehicular body color. The light guiding member 43 has an extension part 43a extending downward and a red color filter 45 is arranged opposite to a lower end face 43b of the extension part 43a which is somewhat slant. The red color filter covers a paraboloid reflector 46 like a lid, and at a focus of the paraboloid reflector 46 is arranged a bulb 47.

When the bulb 47 is turned off, exterior light passes through the outer lens 41, the transmission type hologram sheet 42 and the light guiding member 43 and reflects at the colored base sheet 44, so that the color of the colored base sheet 44, namely the color of the vehicular body, can be seen as it is on the outer lens surface of the taillight 40 and the existence of the taillight 40 is not conspicuous.

When the bulb 47 is turned on, the light from the bulb 47 reflects at the paraboloid reflector 46 to generate parallel light, passes through the red color filter 45 to become red light and enters into the light guiding member 43. The red light then advances within the light guiding member 43 repeating reflection to the reverse side surface of the transmission type hologram sheet 42, is refracted at the surface and passes through the hologram sheet 42 to light the outer lens surface of the taillight 40 in red.

The taillight 40 assumes the same color as the painted color of the vehicular body and its existence is not conspicuous when the bulb 47 is turned off, but it can play a role as a stoplight because it lights up in red when the bulb 47 is turned on. Therefore, the degree of freedom of the appearance design is improved. Because it can be constructed flat in its entirety by arranging the light source part in a lower end portion, a large attaching space is unnecessary and the degree of freedom of the layout is also improved. In addition, the suspected lighting caused by external light in conventional lamplight devices can be prevented.

Instead of using the colored base sheet 44 of the same color as the vehicular body color, the light guiding member 43 may be joined to the painted vehicular body surface directly. Therefore, the colored base sheet 44 is not indispensable.

The present invention can be applied also to other various lamplight devices such as a fog light, a front winker or the like.

Although there have been described what are present considered to be the preferred embodiments of the invention, it will be understood that variations and modifications may be made thereto without departing from the spirit and essence thereof. The scope of the invention is indicated by the appended claims, rather than by the foregoing description.

What is claimed is:

1. A lamplight device for a vehicle comprising:
   a reflection type optical member installed on a light-impervious, exterior surface of a vehicular body and adapted to reflect light of a specific wave length;

a light projecting means for projecting light of said specific wave length; and a light guiding means for guiding the light projected from said light projecting means to an outer surface of said reflection type optical member.

2. A lamp light device for a vehicle comprising:

a transmission type optical member installed on a light-impervious, exterior surface of a vehicular body and adapted to refract light of a specific wave length;

a light projecting means for projecting light of said specific wave length; and a light guiding means for guiding the light projected from said light projecting means to a reverse surface of said transmission type optical member.

3. A lamp light device for a vehicle as claimed in claim 1, including:

first and second reflection type optical members respectively adapted to reflect light of first and second specific wave lengths different from each other, the optical members being combined;

said light guiding means includes a substantially planar member having said combined optical members arranged adjacent to one face thereof;

a first light projecting means for projecting a light of a first specific wave length is positioned at an end portion of said substantially planar member near to said first optical member; and a second light projecting means for projecting light of said second specific wave length is positioned at another end portion of said substantially planar member near to said second optical member;

thereby the lights of said first and second different wave lengths are entered into said substantially planar member from both said end portions thereof.

4. A lamp light device according to claim 1, wherein said optical member is installed directly on said exterior surface of the vehicular body, and an appearance of a surface of the exterior surface is visible through the optical member when said light projecting means is not projecting said light.

5. A lamp light device for a vehicle according to claim 1, further including:

a base member disposed between said optical member and the exterior surface of the vehicular body, and an appearance of a surface of said base member is visible through said optical member when said light projecting means is not projecting said light.

6. A lamp light device according to claim 2, wherein said optical member is installed on the exterior Surface of the vehicular body through said light guiding means, and an appearance of a surface of said exterior surface is visible through said optical member when said light projecting means is not projecting said light.

7. A lamp light device for a vehicle according to claim 2, further including:

a base member disposed between said optical member and the exterior surface of the vehicular body, and an appearance of a surface of said base member is visible through said optical member when said light projecting means is not projecting said light.

8. A lamp light device for a vehicle as claimed in claim 2, including:

first and second transmission type optical members respectively adapted to refract light of first and second specific wave lengths different from each other, the optical members being combined;

said light guiding means includes a substantially planar member having said combined optical members arranged adjacent to one face thereof;

a first light projecting means for projecting a light of said first specific wave length is positioned at an end portion of said substantially planar member near to said first optical member; and a second light projecting means for projecting a light of said second specific wave length is positioned at another end portion of said substantially planar member near to said second optical member;

thereby lights of said first and second different wave lengths are entered into said substantially planar member from said end portions thereof.

9. A lamp light device according to claim 1, wherein said light guiding means includes a substantially planar member, said optical member is disposed on a surface of said substantially planar member and together the light guiding means and the optical member have a layered, substantially flat configuration.

10. A lamp light device according to claim 2, wherein said light guiding means includes a substantially planar member, said optical member is disposed on a surface of said substantially planar member and together the substantially planar member and the optical member have a layered, substantially flat configuration.

11. A lamp light device comprising:

a specific light wave length optical member adapted to be installed on a light-impervious, exterior surface of an object;

a light projecting means for projecting light of said specific wave length; and a light guiding means for guiding the light projected from said light projecting means to a surface of said optical member such that the light will then be projected away from the object by said optical member;

said optical member permitting exterior light to pass therethrough when said light projecting means is not projecting said light of said specific wave length so that the exterior surface of said object is visible through the optical member.

12. A lamp light device as claimed in claim 11 including:

first and second optical members respectively associated with light of first and second specific wave lengths different from each other, the optical members being combined;

said light guiding means includes a substantially planar member having said combined optical members arranged adjacent to one face thereof;

a first light projecting means for projecting light of said first specific wave length is positioned at an end portion of said substantially planar member near to said first optical member; and a second light projecting means for projecting a light of said second specific wave length is positioned at another end portion of said substantially planar member near to said second optical member;

thereby lights of said first and second different wave lengths are entered into said substantially planar member from both said end portions.

13. A lamp light device according to claim 11, wherein said optical member is installed directly on said exterior surface of said object such that an appearance of the exterior surface is visible through the optical member when said light projecting means is not projecting light.

14. A lamp light device according to claim 11, further including:
   a base member disposed between said optical member and the object, and an appearance of a surface of said base member is visible through said optical member when said light projecting means is not projecting said light.

15. A lamp light device according to claim 3, wherein said first and second optical members as combined are disposed in a plane with an end edge of said first optical member connected to an end edge of said second optical member.

16. A lamp light device according to claim 11, wherein said light guiding means also functions as an exterior lens on the vehicle.

17. A lamp light device according to claim 5, wherein each of said light guiding means, said optical member, and said base member is substantially planar, and said optical member, said light guiding means and said base member are joined together in a flat, layered configuration.

18. A lamp light device according to claim 7, wherein each of said light guiding means, said optical member, and said base member is substantially planar, and said optical member, said light guiding means and said base member are joined together in a flat, layered configuration.

19. A lamp light device according to claim 11, wherein said light guiding means includes a substantially planar member, said optical member is disposed on a surface of said substantially planar member, and together the substantially planar member and the optical member has a layer, substantially flat configuration.

20. A lamp light device according to claim 11, wherein said exterior surface of said object is visible through both said optical member and said light guiding means when said light projecting means is not projecting light.

* * * * *

UNITED STATES PATENT AND TRADEMARK OFFICE
CERTIFICATE OF CORRECTION

PATENT NO. : 5,711,592

DATED : 27 January 1998

INVENTOR(S) : Yoshihiko Hotta

It is certified that error appears in the above-identified patent and that said Letters Patent is hereby corrected as shown below:

On the cover page, in the Abstract,
    line 4, after "body" insert a comma;
    line 6, change "a light" to --light--;
    line 10, change "an reverse" to --a reverse--.

Column 1, line numbered between 34 and 35, change "turn" to --turned--;
    line numbered between 48 and 49, change "Ions" to --lens--;
    line numbered between 50 and 51, change "there s" to --there is--;
    line 60, after "to" insert --improve--.

Column 2, line numbered between 24 and 25, after "refract" insert --light--;
    line 67, begin a new paragraph at "Other".

Column 3, line numbered between 33 and 34, change "direction" to --directions--;
    line numbered between 45 and 46, change "direction" to --directions--;
    line 66, change "direction" to --directions--.

Column 4, line 7, after "surface" insert --11c--;
    line 9, change "entirely" to --entirety--; delete "11c";
    line 14, delete the comma;
    line numbered between 27 and 28, change "vehicle" to --vehicle's--;
    line numbered approximately 49, change "left direction" to --left directions--;

UNITED STATES PATENT AND TRADEMARK OFFICE
CERTIFICATE OF CORRECTION

PATENT NO. : 5,711,592
DATED : 27 January 1998
INVENTOR(S) : Yoshihiko Hotta

It is certified that error appears in the above-identified patent and that said Letters Patent is hereby corrected as shown below:

Column 4, line numbered approximately 52, change "direction" to --directions--.

Column 5, line numbered between 23 and 24, delete "when";
line numbered between 24 and 25, change "the LEDs 26, 28 are not lit light 20 is not conspicuous" to --light 20 is not conspicuous when the LEDs 26, 28 are not lit--;
line 38, change "LED" to --LEDs--.

Column 6, line numbered approximately 56, before "present" insert --at--.

Column 7, line numbered between 49 and 50, change "Surface" to --surface--.

Column 9, line 11, change "11" to --9--.

Column 10, 10th line, change "layer" to --layered--.

Signed and Sealed this

Second Day of June, 1998

Attest:

BRUCE LEHMAN

*Attesting Officer*    *Commissioner of Patents and Trademarks*